United States Patent [19]

Krueger

[11] Patent Number: 4,780,482

[45] Date of Patent: Oct. 25, 1988

[54] INTEGRAL SKIN RIGID POLYURETHANE STRUCTURAL FOAM

[75] Inventor: David C. Krueger, Grosse Ile, Mich.

[73] Assignee: BASF Corporation, Parsippany, N.J.

[21] Appl. No.: 45,623

[22] Filed: May 1, 1987

[51] Int. Cl.$^4$ .............................................. C08G 18/30
[52] U.S. Cl. ...................................... 521/51; 521/155; 521/164; 521/173
[58] Field of Search ................. 521/51, 155, 164, 173

[56] References Cited

U.S. PATENT DOCUMENTS 4,305,991  12/1981  Mayborg et al. ...................... 521/51

Primary Examiner—John Kight
Assistant Examiner—S. A. Acquali
Attorney, Agent, or Firm—William G. Conger

[57] ABSTRACT

The invention relates to integral skin rigid polyurethane structural foam having high impact strength, high heat distortion and flame retardant properties. This foam is prepared from a polyol selected from the group consisting of polyoxyalkylene polyether polyol, a polyester polyol or mixture thereof, an organic polyisocyanate, a chain extender and blowing agent.

12 Claims, No Drawings

INTEGRAL SKIN RIGID POLYURETHANE STRUCTURAL FOAM

BACKGROUND OF THE INVENTION

1. Field of the Invention

The present invention pertains to integral skin rigid polyurethane structural foam compositions. More particularly, the present invention relates to the preparation of integral skin rigid polyurethane structural foam which contains polyether polyol, polyester polyol, an organic polyisocyanate and a chain extender.

2. Description of the Prior Art

The use of triisopropanolamine in combination with alkylene oxide adducts of aliphatic and aromatic amines has been disclosed in the prior art. U.S. Pat. No. 4,588,803 teaches the preparation of low shrinkage polyurethane sealant compositions employing among other reactants ethylene oxide adducts of toluenediamine and triisopropanolamine. U.S. Pat. No. 4,605,725 teaches the preparation of polyurethane sealant compositions employing alkylene oxide adducts of monoethanolamine in the presence of triisopropanolamine.

SUMMARY OF THE INVENTION

The present invention applies to integral skin rigid polyurethane structural foam compositions, which are prepared by the reaction of a polyol with an organic polyisocyanate in the presence of an effective amount of a chain extender. The amount of chain extender ranges from about 5 weight percent to about 40 weight percent based on the total weight of the composition.

For a more complete understanding of the present invention, reference is made to the following detailed description and the examples thereof.

DESCRIPTION OF THE PREFERRED EMBODIMENTS

It has unexpectedly been found that, in the preparation of integral skin rigid polyurethane structural foam products of high impact strength, high heat distortion and flame retardant properties are obtained by reacting
(a) a polyol selected from the group consisting of a polyoxyalkylene polyether polyol, a polyester polyol, or a mixture thereof,
(b) an orgagnic polyisocyanate,
(c) a chain extender, and
(d) blowing agent, and
(e) optionally pigment and flame retardant.

Representative polyols which may be employed in the invention are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polYols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain 2 or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used.

The alkylene oxide adducts of amines are prepared by reacting the alkylene oxides with 2,3-, 2,6-, 3,4-, 2,5- and 2,4-toluenediamine, ethylene diamine and diaminodiphenylmethane. The procedures employed are those well known to those skilled in the art.

Any suitable alkylene oxide may be used such as ethylene oxide, propylene oxide, butylene oxide, amylene oxide and mixtures of these oxides. Preferred are ethylene oxide and propylene oxide wherein the ethylene oxide content is less than about 35 weight percent of the adduct. The molecular weights of these adducts may range from about 400 to about 800. Polyoxyethylene polyester polyols, other than those derived from the diamines, are also employed in conjunction with the adducts of the diamines. The amounts of these non-amine polyols may range from about 0 weight percent to about 50 weight percent based on the total weight of the foam composition. The molecular weight of these polyols may range from about 200 to about 1000.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydromuconic acid, $\beta$-hydromuconic acid, $\alpha$-butyl-$\alpha$-ethyl-glutaric acid, $\alpha,\beta$-diethylsuccinic acid, isophthalic acid, terephthalic acid, hemimellitic acid, and 1,4-cyclohexane-dicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, $\alpha$-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

Other polyesters which may be employed are the mixed polyesters derived from the "bottoms" obtained by the transesterification of the dimethylterephthalate esters with diethylene glycol. One common designation is TERATE 203. Other polyesters which may be employed are the mixed polyester polyols derived from polyethylene terephthalate. Such polyesters are designated as Chardol 574, 570 and 740. These polyesters may have hydroxyl numbers from about 300 to about 800.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxy ethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two of more alkylene oxides. The polyoxyalkylene polyether polyols may be prepared by any known process such as, for example, the process disclosed by Wurtz in 1859 and *Encyclopedia of Chemical Technology*, Vol. 7, pp, 257-262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from about 100 to about 1000.

Suitable polyhydric polythioethers which may be condensed with alkylene oxides include the condensation product of thiodiglycol or the reaction product of a dicarboxylic acid such as is disclosed above for the preparation of the hydroxylcontaining polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing one or two —SH groups such as 2-mercaptoethanol, 1,2-ethanedithiol, 1,2-propanedithiol, 1,3-propanedithiol, and 1,6-hexane dithiol; alkene thiols such as 2-butene-1,4-dithiol; and alkyne thiols such as 3-hexyne-1,6-dithiol.

The polyurethane foam employed in the present invention are generally prepared by the reaction of the polyols with an organic polyisocyanate in the presence of a blowing agent and in the presence of additional polyhydroxyl-containing components, chain-extending agents, catalysts, surface-active agents, stabilizers, dyes, fillers and pigments. Suitable processes for the preparation of cellular polyurethane foams are disclosed in U.S. Pat. No. Re. 24,514 together with suitable machinery to be used in conjunction therewith. When water is added as the blowing agent, corresponding quantities of excess polyisocyanate to react with the water and produce carbon dioxide may be used. It is also possible to proceed with the preparation of the polyurethane foams by a prepolymer technique wherein an excess of organic polyisocyanate is reacted in a first step with the diamine adducts of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene, azo compounds such as axohexahydrobenzodinitrile; halogenated hydrocarbons such as dichlorodifluoromethane, trichloro-fluoromethane, dichlorodifluoroethane, vinylidene chloride, and methylene chloride may be used as blowing agents. A combination of blowing agents may also be employed.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4-and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethldiphenylmethane-4,4'-diisocyanate; the triisocyanates such as 4,4',4''-triphenylmethane triisocyanate, and tolune 2,4,6-triisocyanate; and the tetraisocyanates such as 4,4'-dimethldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane diisocyanate and crude polymethylene polyphenylene polyisocyanate.

Oher crude polyisocyanates may also be used in the compositions of the present invention, such as crude toluene diisocyanate obtained by the phosgenation of a mixture of toluene diamines.

Chain extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, glycerine, trimethylolpropane, propylene glycol, 1,4-butanediol and primary and secondary diamines such as phenylenediamine, 1,4-cyclohexane-bis-(methylamine), ethylenediamine, diethylenetriamine, N-(2-hydroxypropyl)ethylenediamine, N,N'-di(2-hydroxypropyl)ethylenediamine, piperazine, 2-methylpiperazine, 2,3-, 2,6-, 3,4-, 2,5-, 2,4-toluenediamine, 2,4'- and 4,4'-diphenylmethanediamine.

An especially preferred group of chain extenders are glycerine and alkanolamines, such as triethanolamine and triisopropanolamine.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, -methoxypropyldimethylamine, N,N,N'-trimethylisopropyl propylenediamine, 3-diethylaminopropyldiethylamine, dimethylbenzylamine, and the like. Other suitable catalysts are, for example, dibutyltin dilaurate, dibutyltindiacetate, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams may collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

The following examples illustrate the nature of the invention. All parts are by weight unless otherwise designated. The physical properties were determined using the following ASTM test methods:
D1622
D1623
D790
D256
D2240.

The following abbreviations were employed in the examples below:

Polyol A is a propylene oxide adduct of glycerine and propylene glycol having a hydroxyl number of about 58.

Polyol B is a propylene oxide adduct of sucrose and glycerine having a hydroxyl number of about 500.

Polyol C is a propylene oxide, ethylene oxide adduct of dipropylene glycol and toluenediamine containing 90 percent vicinal isomers, 56 percent propylene oxide and having a hydroxyl number of about 450.

Polyol D is a propylene oxide adduct of sucrose and dipropylene glycol having a hydroxyl number of about 397.

Polyol E is a propylene oxide adduct of toluenediamine containing 90 percent vicinal isomers having a hydroxyl number of about 390.

Polyol F is a propylene oxide adduct of pentaerythritol and propylene glycol having a hydroxyl number of about 555.

Polyol G is a propylene oxide adduct of glycerine having a hydroxyl number of about 398.

Polyol H is a propylene oxide adduct of propylene glycol having a hydroxyl number of about 260.

Terate 203 is a mixture of dimethyl and diethylene glycol esters of terephthalic acid having a hydroxyl number of about 310 and sold by Hercules Corporation.

TIPA is triisopropanolamine.

L5420 is a silicone surfactant sold by Union Carbide Corporation.

DC-197 is a silicone surfactant sold by Dow Corning Corporation.

R-113 is 1,1,2,-trichloro-, 1,2,2-trifluoroethane sold by DuPont Corporation.

R-11a is dichlorodifluoromethane sold by DuPont Corporation.

Fyrol PCF is tris(B-chloropropyl)phosphate sold by Stauffer Chemical Corporation.

Dabco 33LV is 33 percent triethylenediamine in dipropylene glycol sold by Air Products Corporation.

T-131 is an organotin catalyst sold by Air Products Corporation.

LUPRANATE M-20S is polymeric methylenediphenyldiisocyanate (MDI) containing about 44 percent 2-ring MDI sold by BASF Corporation.

Foam preparation procedure used for Examples 1 through 30.

The indicated amounts of polyether polyol, polyester polyol, and glycerine were added to a suitable mixing vessel. Melted TIPA was added in the appropriate amounts and blended with the polyols. To this blend the silicone surfactant(s), blowing agent(s), fire retardant(s) and catalyst(s) were added as indicated for Examples 1 through 10 and 11 through 30. This blend was well mixed and loaded into the resin day tank of EMB Puromat 30 machine. The isocyanate component was loaded into the isocyanate day tank. The two components were conditioned to nominally 27° C. and the foam machine was calibrated to mix the resin and isocyanate components at the indexes indicated:

Examples 1 through 10, Index=100
Examples 11 through 20, Index=107
Examples 21 through 30, Index=135.

The impingement mixing pressure was adjusted to 160 bar. The test samples were made using a 2.5 cm×30.5 cm×30.5 cm or a 1.25 cm×30.5 cm×30.5 cm metal plaque mold preheated to 55° C. The amount of foam poured into the plaque mold was adjusted to obtain different density samples. The foam plaque was subsequently removed from the mold and aged for at least seven days prior to physical testing.

EXAMPLES 1-10

The formulation employed in Examples 1-10 was as follows:

| | |
|---|---|
| Polyol A | 20 |
| Polyol B | 10 |
| Polyol C | 25 |
| Terate 203 | 20 |
| TIPA | 20 |
| Glycerine | 5 |
| DC-197 | 0.7 |
| L-5420 | 0.8 |
| R-113 | 4 |
| R-11A | 4 |
| Fyrol PCF | 12 |
| Dabco 33LV | 1.0 |
| T-131 | 0.01 |
| Lupranate M-20S (Index) | 100 |

TABLE I

| Physical Properties | Example | | | | | | | | | |
|---|---|---|---|---|---|---|---|---|---|---|
| | 1 | 2 | 3 | 4 | 5 | 6 | 7 | 8 | 9 | 10 |
| Density, Kg/M$^3$ | 919 | 783 | 621 | 481 | 324 | 721 | 572 | 545 | 428 | 293 |
| Tensile Strength, kPa | 16,713 | 18,410 | 10,756 | 12,066 | 4,530 | 18,506 | 16,210 | 9,205 | 8,895 | 5,268 |
| Elongation, % | 5.8 | 7.3 | 6.6 | 7.9 | 6.2 | 6.0 | 8.9 | 4.7 | 5.4 | 6.2 |

TABLE I-continued

| Physical Properties | Example | | | | | | | | | |
|---|---|---|---|---|---|---|---|---|---|---|
| | 1 | 2 | 3 | 4 | 5 | 6 | 7 | 8 | 9 | 10 |
| Flextural Strength, kPa | 26,298 | 31,731 | 20,940 | 13,280 | 9,177 | 56,305 | 46,376 | 39,095 | 24,408 | 11,653 |
| Shore D Instantaneous/5 sec. | 77/75 | 76/75 | 72/71 | 64/60 | 71/66 | 72/69 | 70/68 | 73/71 | 72/70 | 67/65 |
| Izod Impact Unnotched Joules | 1.78 | 0.53 | 1.20 | 1.07 | 0.53 | 0.41 | 4.75 | 3.12 | 1.22 | 0.54 |
| Sample Thickness, mm | 25.4 | 25.4 | 25.4 | 25.4 | 25.4 | 12.7 | 12.7 | 12.7 | 12.7 | 12.7 |
| Heat Distortion at 455 kPa, °C. | 116 | 116 | 115 | 112 | 102 | 101 | 89 | 92 | 89 | 86 |
| UL-94 Vertical VO | | | | | | | | | | |
| *SX time, sec. | 1.4 | 1.5 | 1.0 | 1.4 | 2.2 | 1.0 | 1.5 | 1.3 | 2.2 | 3.1 |
| P = Pass/F = Fail | P | P | P | P | P | P | P | P | P | P |

*self-extinguishing

EXAMPLES 11-30

The formulation employed in Examples 11-30 was as follows:

| | |
|---|---|
| Polyol A | 22 |
| Polyol D | 10 |
| Polyol E | 23 |
| Terate 203 | 20 |
| Glycerine | 5 |
| TIPA | 20 |
| DC-197 | 0.7 |
| L-5420 | 0.8 |
| R-113 | 4 |
| R-11A | 4 |
| Fyrol PCF | 12 |
| Dabco 33LV | 1.0 |
| T-131 | 0.01 |
| Lupranate M-20S Index | 107 for Examples 11-20 and 135 for Examples 21-30 |

TABLE II

| Physical Properties | Example | | | | | | | | | |
|---|---|---|---|---|---|---|---|---|---|---|
| | 11 | 12 | 13 | 14 | 15 | 16 | 17 | 18 | 19 | 20 |
| Density, Kg/M³ | 803 | 668 | 482 | 581 | 317 | 769 | 788 | 617 | 416 | 394 |
| Tensile Strength, kPa | 17,306 | 16,700 | 13,073 | 12,204 | 9,729 | 25,780 | 13,659 | 14,693 | 9,308 | 6,536 |
| Elongation, % | 6.8 | 8.3 | 8.0 | 9.9 | 8.4 | 9.6 | 6.2 | 7.1 | 6.4 | 7.2 |
| Flextural Strength, kPa | 49,506 | 31,110 | 31,110 | 20,650 | 10,791 | 66,123 | 30,579 | 30,448 | 24,753 | 9,929 |
| Shore D Instantaneous/5 sec. | 72/71 | 68/67 | 72/71 | 65/64 | 63/61 | 66/65 | 66/65 | 64/63 | 46/45 | 57/56 |
| Izod Impact Unnotched Joules | 3.93 | 2.98 | 1.90 | 1.36 | 0.81 | 2.98 | 2.17 | 2.17 | 1.49 | 1.36 |
| Sample Thickness, mm | 25.4 | 25.4 | 25.4 | 25.4 | 25.4 | 12.7 | 12.7 | 12.7 | 12.7 | 12.7 |
| Heat Distortion at 455 kPa, °C. | 101 | 101 | 101 | 97 | 94 | 94 | 88 | 88 | 72 | 70 |
| UL-94 Vertical VO | | | | | | | | | | |
| *SX time, sec. | 0.8 | 2.2 | 1.5 | 1.7 | 4.5 | 1.0 | 1.2 | 1.6 | 4.1 | 2.1 |
| P = Pass/F = Fail | P | P | P | P | F | P | P | P | F | P |

| Physical Properties | Example | | | | | | | | | |
|---|---|---|---|---|---|---|---|---|---|---|
| | 21 | 22 | 23 | 24 | 25 | 26 | 27 | 28 | 29 | 30 |
| Density, Kg/M³ | 803 | 682 | 546 | 413 | 311 | 746 | 610 | 556 | 424 | 314 |
| Tensile Strength, kPa | 17,044 | 16,514 | 11,032 | 18,265 | 7,102 | 19,216 | 17,941 | 13,611 | 8,943 | 6,523 |
| Elongation, % | 6.2 | 7.2 | 7.9 | 8.9 | 9.5 | 7.9 | 7.3 | 5.8 | 6.0 | 5.0 |
| Flextural Strength, kPa | 51,830 | 44,880 | 15,224 | 33,158 | 12,756 | 51,230 | 55,863 | 46,865 | 14,762 | 23,760 |
| Shore D Instantaneous/5 sec. | 62/61 | 68/67 | 65/64 | 68/67 | 58/54 | 64/61 | 69/68 | 65/64 | 60/59 | 56/55 |
| Izod Impact Unnotched Joules | 2.44 | 1.76 | 1.08 | 2.03 | 0.54 | 2.71 | 1.63 | 3.39 | 0.54 | 2.85 |
| Sample Thickness, mm | 25.4 | 25.4 | 25.4 | 25.4 | 25.4 | 12.7 | 12.7 | 12.7 | 12.7 | 12.7 |
| Heat Distortion at 455 kPa, °C. | 73 | 71 | 72 | 66 | 70 | 71 | 70 | 77 | 71 | 71 |
| UL-94 Vertical VO | | | | | | | | | | |
| *SX time, sec. | 1.7 | 0.9 | 1.0 | 0.9 | 2.4 | 1.0 | 1.0 | 2.1 | 1.6 | 1.5 |
| P = Pass/F = Fail | P | P | P | P | P | P | P | P | P | P |

*self-extinguishing

The foam preparation used for Examples 31 through 43 was a hand mix procedure.

The indicated amounts of polyether polyol, polyester polyol, and chain extender were added to a suitable mixing container. Melted TIPA was added in the appropriate amounts as indicated in Tables III, IV and V. To this container silicone surfactants, blowing agents, fire retardant, catalyst and other additives as indicated in the tables were added and well mixed in the container. This container of resin and a separate container of polymethylene polyphenylene polyisocyanate were conditioned to room temperature (23° C.). Sufficient amounts of the resin component and appropriate amounts of polymethylene polyphenylene polyisocyanate as indicated in the tables were measured into a one-half gallon paper can. The resin and isocyanate components were mixed for 10-15 seconds with a propeller or "Jiffy" mixer at nominally 3000 rpm. The resin/isocyanate mix was weighed into a 55° C. preheated 2.5 cm×30.5 cm×30.5 cm or 12.5 cm×22.9 cm×22.9 cm metal plaque mold. The foam was allowed to rise and cure. Subsequently the foam plaque was removed from the mold and allowed to age for at least seven days prior to physical testing.

TABLE III

| Example | 31 | 32 | 33 | 34 | 35 |
|---|---|---|---|---|---|
| Formulation | | | | | |
| Terate 203 | 15 | 15 | 15 | 15 | 15 |
| Polyol E | 30 | 30 | 30 | 30 | 30 |
| Polyol F | 20 | 18.75 | 17.50 | 16.25 | 15.0 |
| Polyol G | 20 | 15 | 10 | 5 | 0 |
| Ethylene Glycol | 5 | 3.75 | 2.5 | 1.25 | 0 |
| Diethylene Glycol | 0 | 1.25 | 2.5 | 3.75 | 5 |
| Polyol A | 10 | 11.25 | 12.5 | 13.75 | 15.0 |
| TIPA | 0 | 5 | 10 | 15 | 20 |
| R-113 | 5 | 5 | 5 | 5 | 5 |
| R-11a | 5 | 5 | 5 | 5 | 5 |
| Zeolite Paste | 1 | 1 | 1 | 1 | 1 |
| DABCO 33LV | 0.6 | 0.6 | 0.6 | 0.6 | 0.6 |
| DABCO T-131 | 0.04 | 0.04 | 0.04 | 0.04 | 0.04 |
| DC-197 | 0.7 | 0.7 | 0.7 | 0.7 | 0.7 |
| L-5420 | 0.7 | 0.7 | 0.7 | 0.7 | 0.7 |
| Fyrol PCF | 15 | 15 | 15 | 15 | 0 |
| Isocyanate LUPRANATE M-20S | 118 | 120 | 123 | 125 | 127 |
| Handmixed 25.4 mm Plaque Sample | | | | | |
| Physical Properties | | | | | |
| Density Kg/m$^3$ | 508 | 497 | 484 | 484 | 495 |
| Tensile | | | | | |
| Strength kPa | 10,336 | 9,901 | 9,308 | 10,170 | 10,025 |
| Elongation, % | 6.5 | 6.1 | 5.8 | 5.9 | 6.1 |
| Flexural Strength, kPa | 16,679 | 17,162 | 17,189 | 18,520 | 18,492 |
| Shore D Hardness Instantaneous/5 sec. | 79/75 | 80/76 | 78/75 | 77/75 | 78/76 |
| UL-94 Vertical (SX times) sec. | 12.6 | 6.4 | 6.2 | 5.9 | 110 |
| Heat Distortion (at 455 kPa) °C. | 70 | 75 | 73 | 77 | 89 |
| IZOD, Joules (Unnotched) | 0.83 | 0.83 | 0.77 | 1.00 | 0.79 |

TABLE IV

| Example | 36 | 37 | 38 | 39 | 40 |
|---|---|---|---|---|---|
| Formulation | | | | | |
| Terate 203 | 15 | 15 | 15 | 15 | 15 |
| Polyol E | 35 | 30 | 30 | 10 | 10 |
| Polyol C | 0 | 0 | 0 | 20 | 20 |
| Polyol F | 0 | 10 | 15 | 15 | 13 |
| Polyol A | 25 | 20 | 15 | 15 | 15 |
| Ethylene Glycol | 0 | 0 | 0 | 5 | 7 |
| Diethylene Glycol | 0 | 0 | 5 | 0 | 0 |
| Polyol H | 5 | 5 | 0 | 0 | 0 |
| TIPA | 20 | 20 | 20 | 20 | 20 |
| R-113 | 5 | 5 | 5 | 5 | 5 |
| R-11a | 5 | 5 | 5 | 5 | 5 |
| Zeolite Paste | 1 | 1 | 1 | 1 | 1 |
| DABCO 33LV | 0.6 | 0.6 | 0.6 | 0.6 | 0.6 |
| DABCO T-131 | 0.04 | 0.04 | 0.04 | 0.04 | 0.04 |
| DC-197 | 0.7 | 0.7 | 0.7 | 0.7 | 0.7 |
| L-5420 | 0.7 | 0.7 | 0.7 | 0.7 | 0.7 |
| Fyrol PCF | 15 | 15 | 15 | 15 | 15 |
| Isocyanate LUPRANATE M-20S | 100 | 109 | 127 | 141 | 148 |
| Handmixed 25.4 cm Plaque Sample | | | | | |
| Physical Properties | | | | | |
| Density Kg/m$^3$ | 481 | 500 | 498 | 473 | 509 |
| Tensile | | | | | |
| Strength kPa | 9,708 | 11,611 | 10,080 | 8,881 | 10,232 |
| Elongation, % | 10.5 | 9.4 | 6.6 | 5.5 | 6.8 |
| Flexural Strength, kPa | 13,942 | 16,203 | 17,851 | 13,680 | 19,947 |
| Shore D Hardness Instantaneous/5 sec. | 72/70 | 75/73 | 68/66 | 75/71 | 78/76 |
| UL-94 Vertical (SX times) sec. | 1.6 | 2.5 | 4.5 | 2.9 | 1.1 |
| Heat Distortion (at 455 kPa, °C. | 78 | 73 | 83 | 87 | 89 |
| IZOD, Joules (Unnotched) | 0.98 | 0.81 | 0.81 | 0.69 | 0.75 |

TABLE V

| Example | 41 | 42 | 43 |
|---|---|---|---|
| Formulation | | | |
| Polyol H | 5 | 5 | 5 |
| Polyol A | 25 | 25 | 25 |
| Polyol E | 20 | 20 | 20 |
| Polyol F | 20 | 20 | 20 |
| Ethylene Glycol | 5 | 0 | 0 |
| Diethylene Glycol | 0 | 5 | 0 |
| Glycerine | 0 | 0 | 5 |
| TIPA | 25 | 25 | 25 |
| R-113 | 4.5 | 4.5 | 4.5 |
| R-11a | 4.5 | 4.5 | 4.5 |
| DABCO 33LV | 0.5 | 0.5 | 0.5 |
| DABCO R-8020 | 0.2 | 0.2 | 0.2 |
| T-131 | 0.03 | 0.03 | 0.03 |
| L-5420 | 0.7 | 0.7 | 0.7 |
| D-197 | 0.7 | 0.7 | 0.7 |
| Fyrol PCF | 15 | 15 | 15 |
| Zeolite Paste | 1 | 1 | 1 |
| Isocyanate LUPRANATE M-20S | 149 | 138 | 149 |
| Handmixed 12.7 mm Plaque Sample | | | |
| Physical Properties | | | |
| Density Kg/m$^3$ | 402 | 396 | 338 |
| Flexural Strength, (psi) | 18,975 | 18,354 | 14,541 |
| UL-94 Vertical (SX times) sec. | 9.7 | 27.3 | 8.4 |
| Heat Distortion (at 455 kPa, °C. | 75 | 69 | 63 |
| IZOD, Joules (Unnotched) | 1.86 | 2.03 | 4.61 |

Examples 1 through 10 exhibit high impact strength high heat distortion at a wide range of densities and good performance in passing the UL-94 Vertical test.

Examples 11 through 30 exhibit the same characteristics as Examples 1 through 10 at different indices.

Tables III and IV illustrate the effect of various levels of TIPA and Table IV reflects the effect of various polyols in combination with TIPA. Table V illustrates that a polyester polyol improves the flame retardancy.

The embodiments of the invention in which an exclusive property or privilege is claimed are defined as follows:

1. A high impact strength, high heat distortion, flame retardant integral skin rigid polyurethane foam consisting of the reaction product of
   (a) a polyol selected from the group consisting of a polyoxyalkylene polyether polyol, a polyester polyol, and mixtures thereof,
   (b) an organic aromatic polyisocyanate,
   (c) a chain extender selected from the group consisting of ethylene glycol, glycerine, trimethylpropane, propylene glycol, butanediol, alkanolamine, and primary and secondary diamine.

(d) blowing agent, and (e) optionally pigment and flame retardant.

2. The foam of claim 1 wherein the polyol is a polyester polyol having a hydroxyl number of from about 300 to about 800.

3. The foam of claim 1 wherein the chain extender is selected from the group consisting of compounds having from about 2 to 4 hydroxyl groups and alkanolamines.

4. The foam of claim 1 wherein the polyol is a mixture of polyoxyalkylene polyether polyol and polyester polyol.

5. The foam of claim 1 wherein the organic polyisocyanate is selected from the group consisting of toluene diisocyanate, diphenylmethane diisocyanate and polymeric diphenylmethane diisocyanate.

6. The foam of claim 1 wherein the chain extender is a mixture of glycerine and triisopropanolamine.

7. A process for preparing a high impact strength, high heat distortion, flame retardant integral skin rigid polyurethane foam consisting of reacting (a) a polyol selected from the group consisting of a polyoxyalkylene polyether polyol, a polyester polyol, and mixtures thereof, (b) an organic aromatic polyisocyanate, (c) a chain extender selected from the group consisting of ethylene glycol, glycerine, trimethylolpropane, propylene glycol, butanediol, alkanolamines, and primary and secondary diamines.

(d) blowing agent, and (e) optionally pigment and flame retardant.

8. The process of claim 7 wherein the polyol is a polyester polyol having a hydroxyl number of from about 300 to about 800.

9. The process of claim 7 wherein the chain extender is selected from the group consisting of compounds having from about 2 to 4 hydroxyl groups and alkanolamines.

10. The process of claim 7 wherein the polyol is a mixture of polyoxyalkylene polyether polyol and polyester polyol.

11. The process of claim 7 wherein the organic polyisocyanate is selected from the group consisting of toluene diisocyanate, diphenylmethane diisocyanate and polymeric diphenylmethane diisocyanate.

12. The process of claim 7 wherein the chain extender is a mixture of glycerine and triisopropanolamine.

* * * * *